J. SCHUMACHER.
METHOD OF TRIMMING AND SUBDIVIDING PLASTER BOARD.
APPLICATION FILED JULY 19, 1920.

1,358,340.

Patented Nov. 9, 1920.
2 SHEETS—SHEET 1.

Inventor
John Schumacher
by Nestall and Wallace
his Attorneys

J. SCHUMACHER.
METHOD OF TRIMMING AND SUBDIVIDING PLASTER BOARD.
APPLICATION FILED JULY 19, 1920.
1,358,340.
Patented Nov. 9, 1920.
2 SHEETS—SHEET 2.
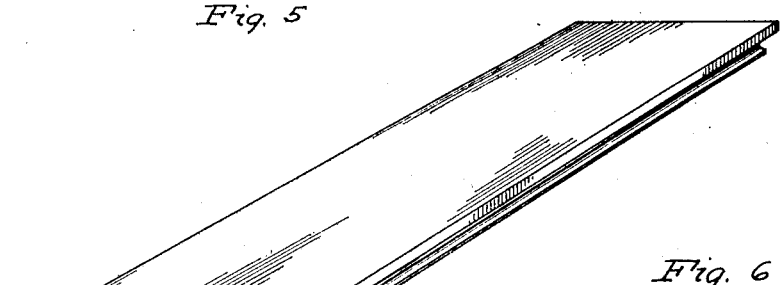
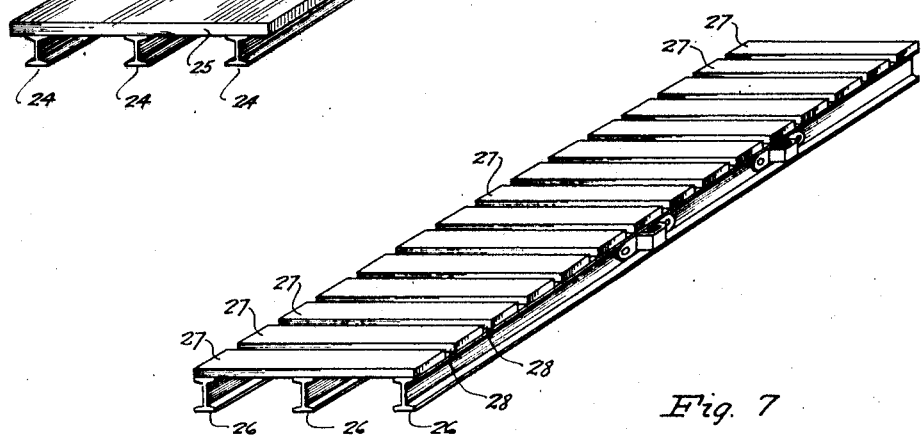
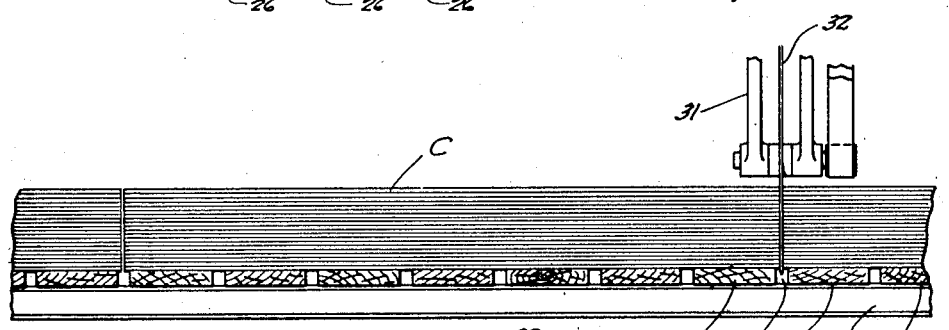
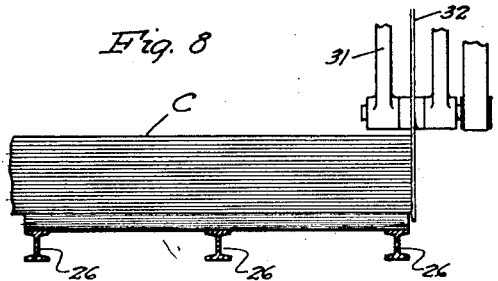
Inventor
John Schumacher
by Nestall and Wallace
his Attorneys

UNITED STATES PATENT OFFICE.

JOHN SCHUMACHER, OF LOS ANGELES, CALIFORNIA.

METHOD OF TRIMMING AND SUBDIVIDING PLASTER-BOARD.

1,358,340.          Specification of Letters Patent.       Patented Nov. 9, 1920.

Application filed July 19, 1920. Serial No. 397,199.

*To all whom it may concern:*

Be it known that I, JOHN SCHUMACHER, a citizen of the United States, and residing at Los Angeles, in the county of Los Angeles and State of California, have invented new and useful Improvements in Methods of Trimming and Subdividing Plaster-Board, of which the following is a specification.

This invention relates to a method of subdividing and trimming plaster board and especially to the steps before actual severing of the board.

In a well known method of making plaster board, initial lengths of the green board are piled or stacked on trays in their moist and plastic condition, in which position the plaster is allowed to harden or set. After the plaster has set, the lengths are subdivided and trimmed by passing the tray with the plaster board stacked thereon under a circular saw. In order to sever all of the sheets of board in the stack, especially the bottom sheet, the saw edge must pass slightly below the under surface of the bottom sheet. This requires kerfs in the tray at the lines of severance, or the kerfs are formed by the saw cutting into the tray's surface. In either event the tray eventually has kerfs in its surface. The result is that the sheet of green plaster board first laid on the tray and being the bottom piece sags into the kerfs and sets with prominences on its under surface, which destroys the value of this piece, and the bottom one not being perfectly flat is apt to cause the upper ones to be hardened with irregular surfaces. This invention is associated with such a process for making plaster board, and the primary object thereof is to provide steps in the process whereby a flat surface without furrows, kerfs, or prominences is provided for the stack of plaster board to rest on in its green condition and remain while the plaster sets thus producing perfectly flat sheets; thereafter to dispose the plaster board without disturbing the stacked relation so that it may be severed upon a surface having kerfs corresponding to the lines of severance.

These objects are accomplished by the instrumentalities shown in the accompanying drawings, and by means of which my improved process may be carried out. However, the means shown is not the only means by which my process can be effected.

Figure 1:
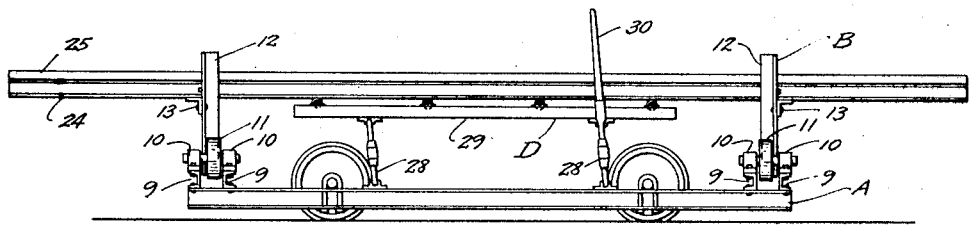
Figure 2:
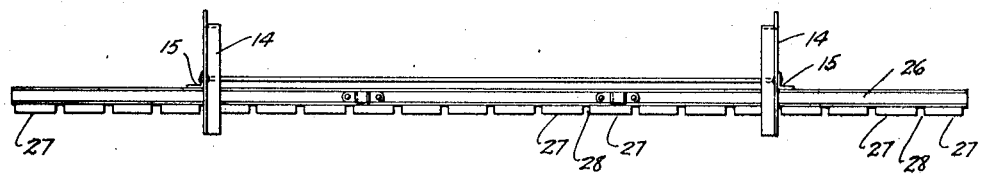
Figure 3:
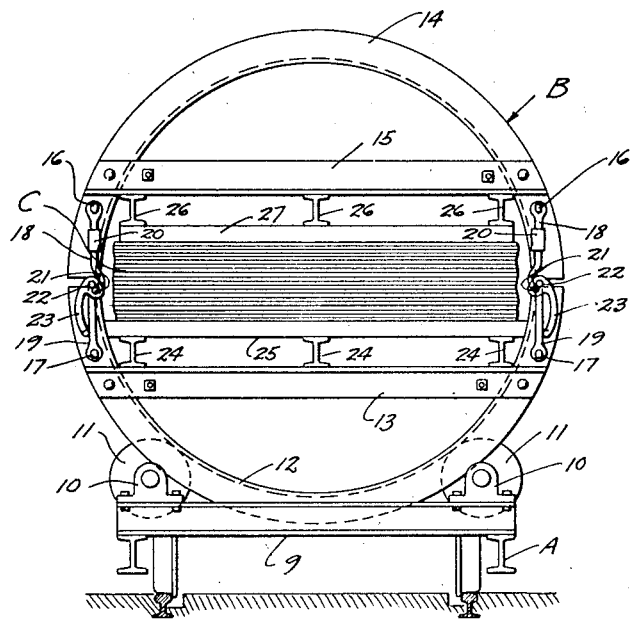
Figure 4:
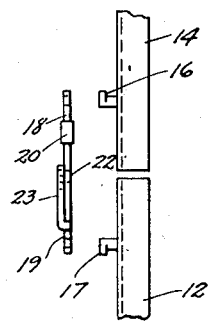

Figure 1 is a side elevation of a car with stack holding mechanism thereon; Fig. 2 is a side view of the cutting tray; Fig. 3 is an end elevation on an enlarged scale of the structure with a stack of plaster board clamped therein; Fig. 4 is a fragmentary side view showing details of the clamping mechanism for the rings; Fig. 5 is a perspective view of the setting tray; Fig. 6 is a perspective view of the cutting tray; Fig. 7 is an enlarged fragmentary sectional view through the cutting tray and a stack of plaster board showing the saw cutting the board; and Fig. 8 is a transverse sectional view showing the saw trimming an edge of the stack.

Referring more particularly to Figs. 1 and 3, a frame supported upon wheels riding upon tracks is indicated by A. The device for holding a stack of plaster board is indicated generally by B, and the stack of plaster board is indicated by C. A leveling frame is indicated generally by D.

The frame A is rectangular, and at each end thereof are a pair of channel irons 9 spaced from one another. Bearing blocks 10 are mounted upon the irons and journaled therein are wheels 11. These wheels support semi-circular sections 12 of angle form. Secured to the sections 12 are bars 13 to support the lower tray. For each semi-circular section 12 there is a corresponding semi-circular section 14 to complete the ring. Secured to semi-circular section 14 is a bar 15 for supporting the cutting tray. Each pair of sections 12 and 14 forms a split ring. To provide for securing the sections of a ring to each other, hooks 16 are mounted on the sections 14 adjacent their ends, and corresponding hooks 17 are mounted on the sections 12 adjacent their ends. A link 18 having an eye at one end is adapted to slip over a hook 16. A link 19 having an eye is adapted to slip over a hook 17. The link 18 has a turn buckle 20 secured thereto. The end of link 18 has a slight offset provided with a pivot pin 21. On the end of link 19 is a pivot pin 22. A lever 23 is mounted upon the pivot pins 21 and 22. When the links 18 and 19 are placed over their respective hooks, the lever 23, referring to Fig. 3, should be in upper position. To lock the split ring sections together, lever 23 is swung downwardly, thereby moving the ends of the links 18 and 19 past one another. Turn buckle 20 can be moved to insure that the sections of the rings are firmly held.

The setting tray, particularly shown in Fig. 5, is formed of I-beams 24 upon which is mounted any suitable flat supporting member indicated by 25. The details of the tray construction are not important except that the upper surface of the tray is formed without furrows or prominences of any character and is perfectly flat. The member 25 may be secured to the I-beams 24 by any of the well known mechanical expedients.

The cutting tray consists of I-beams 26 covered by strips 27 forming a supporting surface. These strips are spaced from one another to form kerfs 28 for the saw. The outer edges are of the exact dimensions to which the plaster board is to be trimmed. The over all dimensions of this tray are preferably less than that of the setting tray.

The leveling frame D comprises links 28 pivotally mounted upon the side bars of the frame A and pivotally secured at the top to a frame 29 adapted to be disposed underneath the setting tray. Secured to one of the links 28 is a lever 30. The frame 29 extends across the frame A and similar links 28 are mounted upon the opposite side bar of frame A. Thus, the frame 29 when swung upwardly by lever 30 will have a parallel movement. It engages the under side of the tray and levels the latter.

The car holding a tray is moved into position to receive the initial lengths of green plaster board as it comes from the plaster board forming devices. A setting tray is placed upon the bars 13 of section 12 and the tray is leveled by means of the leveling frame D. The green plaster board is stacked thereon, and when the stack C has been completed, it is allowed to set or harden. The severing tray is then placed on the top of the stack as shown in Fig. 3. Sections 14 are then placed in position and clamped to the sections 12 by means of the links 18 and 19. The plaster board having initially hardened is not affected by the clamping. After setting, the leveling frame D is lowered and the stack inverted. This is easily accomplished as the stacks may be rolled and supported upon the rings which ride upon the wheels 11. After the stack has been inverted, sections 12 may be unclamped from sections 14, the sections 12 and setting tray removed, and the cutting tray with the plaster board thereon transferred to position for subdivision and trimming. As the plaster board has set, it has not the softness which would cause the portions of the sheet next to the tray to sag into the kerfs or over the edges of the tray. The sheet which was next to the setting tray has during the setting process rested upon a smooth surface and hardened perfectly flat.

Referring particularly to Figs. 7 and 8, a fragment of a frame 31 carrying a circular saw 32 is shown for subdividing and trimming the board. In Fig. 7, the saw is shown disposed in position for subdividing the board into commercial sizes. It will be noted that the saw enters the kerfs 28, thereby cleanly severing the entire stack of board. In Fig. 8, the saw is shown trimming the edges of the board.

It is obvious that I have provided a method, whereby every sheet of the stack will harden with smooth surfaces and no sheet is lost or damaged.

What I claim is:—

1. The method of severing plaster board, which consists in disposing moist plastic board upon a support having a smooth uninterrupted surface, permitting setting of the plaster, placing a support having a surface with saw kerfs thereover, inverting the board so that it will rest on the support having the kerfs, removing the support having the smooth surface, and severing the board at said kerfs.

2. The method of severing plaster board, which consists in disposing initial lengths of plaster board in superficial contact in a stack upon a support having a smooth surface, permitting setting of the board, after the board has set placing a support on said stack, inverting said stack so that it will rest on the last mentioned support, removing the first mentioned support, and severing the board.

3. The method of severing plaster board, which consists in disposing green board in a stack between supports, the lower support having a smoth uninterrupted surface and the upper support having furrows for a saw, allowing the plaster board to set while on the smooth surface, inverting the stack after the board is set so that it rests on the support having the furrows, removing the support having the smooth surface, and severing the board at said furrows.

4. The method of severing plaster board, which consists in disposing green board in a stack upon a support having a smooth uninterrupted surface, allowing the setting of the plaster, placing thereover a support having a surface not in contact therewith at the desired lines of severance, clamping said supports to each other, inverting the stack after the board is set so that it rests on the last mentioned support, removing the first mentioned support, and severing the board.

5. The method of severing plaster board, which consists in disposing green board in a stack upon a support having a smooth uninterrupted surface, allowing the setting of the plaster, placing thereover a support, clamping said supports to each other, inverting the stack after the board is set so that it rests on the last mentioned support, removing the support having the smooth surface and severing the board at said furrows.

In witness that I claim the foregoing I have hereunto subscribed my name this 8th day of July, 1920.

JOHN SCHUMACHER.